(12) United States Patent
Huang

(10) Patent No.: US 8,624,526 B2
(45) Date of Patent: Jan. 7, 2014

(54) SENSING DEVICE FOR LED LIGHTING EQUIPMENT

(75) Inventor: Wen-I Huang, Luzhu Township, Taoyuan County (TW)

(73) Assignee: IR-TEC International Ltd., Taoyuan County (TW)

( * ) Notice: Subject to any disclaimer, the term of this patent is extended or adjusted under 35 U.S.C. 154(b) by 135 days.

(21) Appl. No.: 13/301,794

(22) Filed: Nov. 22, 2011

(65) Prior Publication Data

US 2013/0127347 A1    May 23, 2013

(51) Int. Cl.
*H05B 37/02*        (2006.01)

(52) U.S. Cl.
USPC ... 315/307; 315/158; 340/539.26; 340/545.3; 340/555

(58) Field of Classification Search
USPC ............. 315/307, 158, 299, 149, 312, 291; 340/239.26, 540, 541, 545.3, 555, 340/573.1
See application file for complete search history.

(56) References Cited

U.S. PATENT DOCUMENTS

| | | | |
|---|---|---|---|
| 2005/0276053 A1* | 12/2005 | Nortrup et al. | 362/294 |
| 2010/0201267 A1* | 8/2010 | Bourquin et al. | 315/32 |
| 2011/0193491 A1* | 8/2011 | Choutov et al. | 315/291 |

* cited by examiner

*Primary Examiner* — Daniel D Chang
(74) *Attorney, Agent, or Firm* — Leong C. Lei

(57) ABSTRACT

A sensing device, for controlling an LED lighting equipment, and more especially for electrical connection with at least one LED lighting equipment that can be driven by a DC power supply, is disclosed. The sensing device, which can be supplied with an external DC power source, comprises a control module, a signal adjusting unit, an object detecting unit, and a manual time-delay adjustor. The control module can send a control signal train of PWM or PFM to the signal adjusting unit, which will in turn send an amplified signal train of PWM or PFM to the LED lighting equipment, so as to control the illuminating level of the equipment. Thus, the problems of the conventional light modulators, resulting from the use of an AC power supply, can be alleviated. Also, the associated cost of the equipment can be reduced.

12 Claims, 5 Drawing Sheets

SENSING DEVICE FOR LED LIGHTING EQUIPMENT

(a) TECHNICAL FIELD OF THE INVENTION

The present invention relates to a sensing device for controlling an LED lighting equipment, and more especially for electrical connection with at least one LED lighting equipment that can be driven by a DC power supply, in which the sensing device can be supplied with an external DC power source, and can send out a signal train of PWM or PFM to the LED lighting equipment, so as to control the illuminating level of the LED lighting equipment, so that the problems of the conventional light modulators, resulting from the use of an AC power supply, can be alleviated, and the associated cost of the equipment can be reduced.

(b) DESCRIPTION OF THE PRIOR ART

As commonly known, the light-emitting device (LED) is a semiconductor, in which electrons and electron holes are combined to release energy in the form of photons, and thus to generate a cold light. Also, the LED can be operated at low voltage to generate a light of certain intensity, and it has various advantages, such as lower energy consumption, smaller size, fast switching, robustness, and longer lifetime. Thus, it has become a lighting source of new generation and has been widely applied in a variety of terminal equipment and lighting equipment, such as monitors, home appliances, automotive electronic devices, lamps, and so on.

At present, most of LEDs are designed to accept an electrical power from a city power or a power supply unit. A long time use of LEDs with the electrical power may cause a lower performance, in addition to a waste of electrical energy. Under an increasing demands of carbon reduction, there are some lighting products that employ light modulators or light regulators to cooperate with LEDs, so that users may adjust the illuminating levels of the LED lighting products according to the environments, so that the electrical power can be saved to achieve the purpose of carbon reduction.

However, conventional light modulators are designed to output alternating current (AC), whereas LED lighting equipments require direct current (DC), so that they cannot be directly applied to those equipments. Thus, to make use of conventional light modulators, an ac-to-dc adaptor should be employed to allow an LED lighting equipment to be equipped with a conventional light modulator. Also, since conventional light modulators are operated under an AC power, the electronic components in a conventional light modulator each must have a capability to withstand a larger voltage, so that the light modulator can work properly. Thus, the cost and the volume of the light modulator may be increased. Also, some electronic components therein may generate a large amount of heat, and this may reduce the lifetime of the components therein.

In view of the above problems of conventional light modulators, there is a need to provide a sensing device for cooperating with an LED lighting equipment, to overcome the disadvantages thereof.

SUMMARY OF THE INVENTION

The primary object of the present invention is to provide a sensing device for controlling an LED lighting equipment, and more especially for electrical connection with at least one LED lighting equipment that can be driven by a DC power supply, wherein the sensing device is supplied with an external DC power source and can actuate the LED lighting equipment, so that the LED lighting equipment can be controlled to be with an illuminating level. The sensing device comprises a control module, a signal adjusting unit, an object detecting unit, and a manual time-delay adjustor. The control module is capable of receiving external signals and outputting control signals after the external signals being processed, and is capable of sending a control signal train of PWM or PFM. The signal adjusting unit is electrically connected to the control module for receiving the control signal train of PWM or PFM from the control module and increasing the driving force of the control signal train, so that the signal adjusting module can output an amplified signal train of PWM or PFM, which can directly actuate the LED lighting equipment. The object detecting unit is electrically connected to the control module for detecting and determining whether a person is existed or not, so as to send a signal to the control module according to the detection, so that the control module can modify the control signal train of PWM or PFM to allow the LED lighting equipment to be gradually changed to a different illuminating level in response to a state change of the signal sent from the object detecting unit. The manual time-delay adjustor is electrically connected to the control module for adjusting a delay time between a first illuminating level and a second illuminating level, whereby the control module can modify the control signal train of pulse-width modulation, according to the delay time, to enable the LED lighting equipment to arrive at the second illuminating level upon the delay time expires. Thus, the problems of the conventional light modulators, resulting from the use of an AC power supply, can be alleviated. Also, the associated cost of the equipment can be reduced.

Another object of the present invention is to provide a sensing device, for controlling an LED lighting equipment, which further comprises a light detecting unit, which is electrically connected to the control module for detecting the level of illumination, and may send a signal to the control module according to the detected level. Thereafter, the control module can send out a control signal train of PWM or PFM, so as to control the LED lighting equipment to be with an illuminating level, such as full brightness, slight brightness, or non-brightness. The light detecting unit can cooperate with the object detecting unit to provide the LED lighting equipment with more illuminating levels.

According to one aspect of the present invention, the manual time-delay adjustor may comprise a variable resistor that can be adjusted to output a voltage to the control module so as to control the delay time between two illuminating levels.

According to a further aspect of the present invention, the control module can select a time value for the delay time from a group of distinct predetermined values, each predetermined value corresponding to a voltage range, so that, if voltages outputted from the variable resistor are within a same voltage range, the delay time will be the same.

Other objects, advantages, and novel features of the present invention will become more apparent from the following detailed description when taken in conjunction with the accompanying drawings.

DETAILED DESCRIPTION OF THE PREFERRED EMBODIMENTS

To allow the features and advantages of the present invention to be fully understood, a description of the present invention will be detailed in the following with reference to the accompanying drawings, which are not used for limitation of the present invention.

Figure 1:
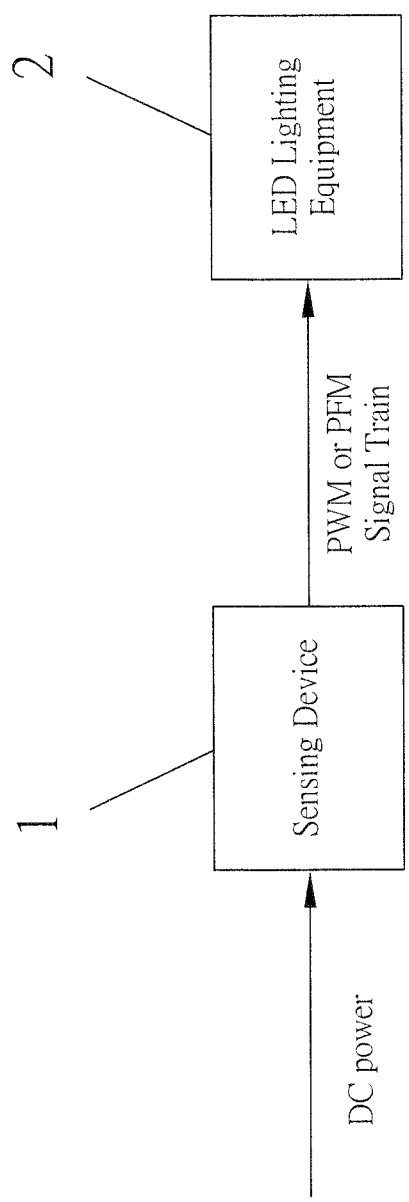
FIG. 1 is a general block diagram of the present invention.
Figure 2:
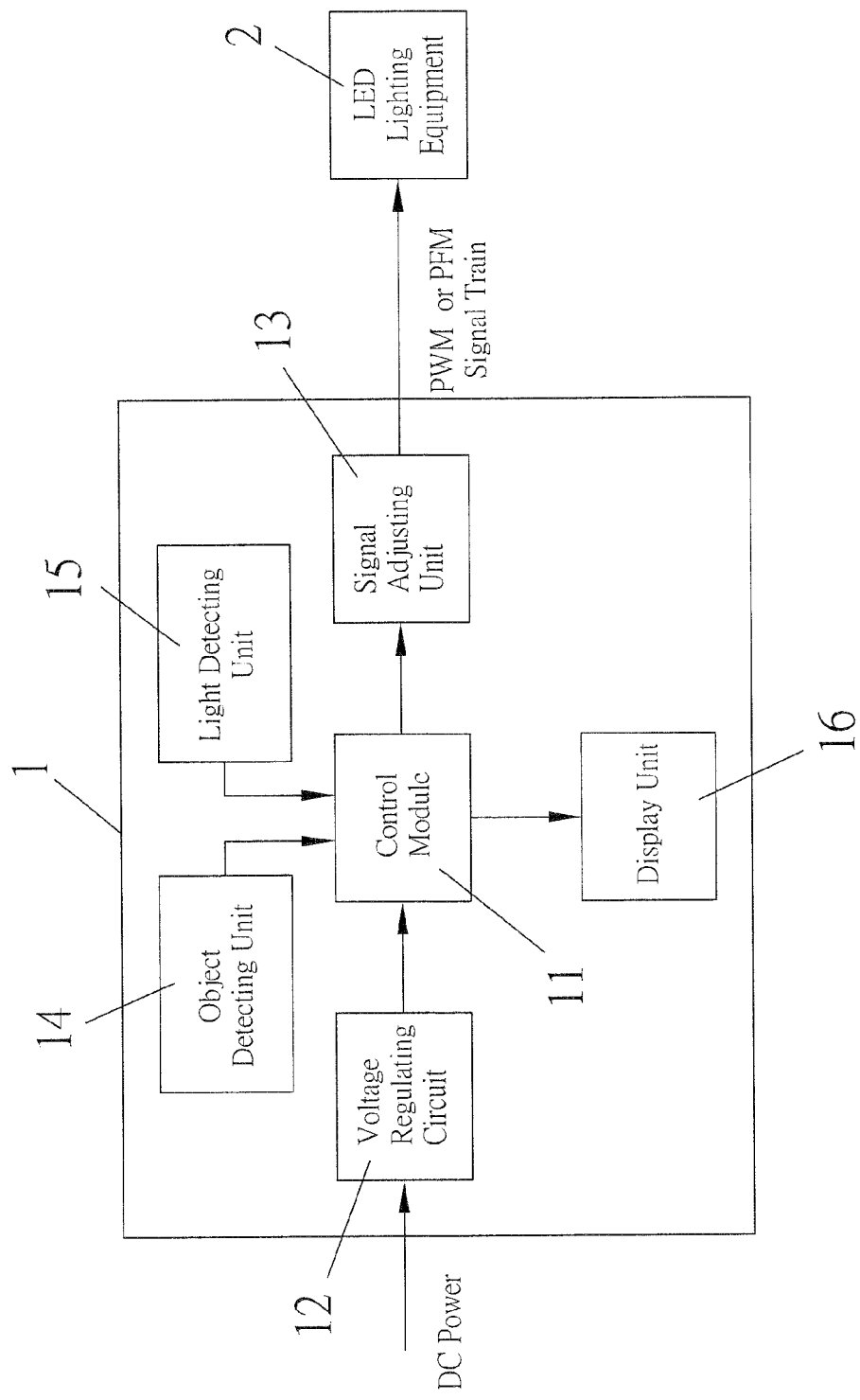
FIG. 2 is a block diagram of the present invention, which shows a first embodiment of the present invention.

Turning now to FIGS. 1 and 2, one embodiment of a sensing device according to the present invention is illustrated and indicated by reference numeral 1. The sensing device 1 is used for controlling an LED lighting equipment 2, especially for electrical connection with at least one LED lighting equipment that can be driven by a DC power supply, wherein the sensing device 1 is supplied with an external DC power source and can actuate the LED lighting equipment 2, so that the LED lighting equipment 2 can be controlled to be with an illuminating level, such as full brightness, slight brightness, or non-brightness. The sensing device 1 generally comprises a control module 11, a voltage regulating circuit 12, a signal adjusting unit 13, an object detecting unit 14, a light detecting unit 15, and a display unit 16.

The control module 11 is capable of receiving external signals and outputting control signals after the external signals being processed. Also, the control module 11 is capable of sending a control signal train of pulse-width modulation (PWM) or pulse-frequency modulation (PFM). The control module 11 can be a microcontroller unit (MCU) or a control IC that can run independently.

The voltage regulating circuit 12 is electrically connected to the control module 11 and can accept the external DC power source, so that a stable DC power can be output from the circuit 12 to supply the control module 11 with suitable electrical power.

The signal adjusting unit 13, being electrically connected to the control module 11 for receiving the control signal train of PWM or PFM from the control module 11 and increasing the driving force of the control signal train (i.e., signal can be amplified), so that the signal adjusting unit 13 can output an amplified signal train of PWM or PFM, which can directly actuate the LED lighting equipment 2.

The object detecting unit 14, being electrically connected to the control module 11, is used for detecting and determining whether or not a person is existed in an outer space, so as to send a signal to the control module 11 according to the detection. The object detecting unit 14 can be a unit employing a technique of active infrared light, passive infrared light, ultrasound, or microwave (being designed via the principles of Doppler effect). For example, the object detecting unit 14 may employ an infrared light to detect whether or not a person is existed, and may send a signal, according to the detection (somebody or nobody existed), to the control module 11. When the control module 11 receive a signal indicating a state change of the outer space, the control module 11 can modify the control signal train of PWM or PFM to allow the LED lighting equipment 2 to be gradually changed to a different illuminating level.

The light detecting unit 15 is electrically connected to the control module 11 for detecting the level of illumination, and may send a signal to the control module 11 according to the detected level. Furthermore, the light detecting unit 15 can cooperate with the object detecting unit 14 to provide the LED lighting equipment 2 with more illuminating levels. For example, when the light detecting unit 15 detects a condition of full brightness (as in daytime of a sunny day), the unit 15 may send a signal, corresponding to the detected condition, to the control module 11; when the light detecting unit 15 detects a semi-brightness (as in daytime of a cloudy day), the unit 15 may send a corresponding signal to the control module 11.

The display unit 16 is electrically connected to a control module 11 for displaying the status information of the control module 11.

With such design, the sensing device 1 can be supplied with an appropriate DC power supply through the voltage regulating circuit 12, which accepts an external DC power source and outputs a stable DC power of constant voltage to the control module 11. As mentioned above, the control module 11 can send a control signal train of PWM or PFM to the signal adjusting unit 13, which is employed to increase the driving force of the signal train (i.e., the signal being amplified), so that the unit 13 can output an amplified signal train of PWM or PFM to directly actuate the LED lighting equipment 2, so that the LED lighting equipment 2 can be controlled to be with an illuminating state, such as full brightness, slight brightness, or non-brightness.

As an example for illustrating the present invention, the control module 11 can send out a control signal train of PWM, wherein each pulse of the control signal train can be adjusted by the control module 11 to have a width suitable to provide an amount of electrical power to the lighting equipment 2, so that a predetermined level of illumination, such as full brightness or slight brightness, can be obtained. As another example for illustrating the present invention, the control module 11 can send out a control signal train of PFM, wherein the signal train can be adjusted by the control module 11 to have a frequency suitable to provide an amount of electrical power to the lighting equipment 2, so that a predetermined level of illumination, such as full brightness or slight brightness, can be obtained.

Furthermore, as mentioned above, the object detecting unit 14 is used for detecting and determining whether or not a person is existed at a location where the lighting equipment 2 is mounted, and will send a signal to the control module 11 according to the detected state. The light detecting unit 15 is used for detecting the level of illumination and will send a signal to the control module 11 according to the detected level. The control module 11 can output a control signal train of PWM or PFM to the signal adjusting unit 13, based on the signals sent from the object detecting unit 14 and the light detecting unit 15. The signal adjusting unit 13 can output an amplified signal train of PWM or PFM, based on the signal train of PWM or PFM sent from the control module 11, to the LED lighting equipment 2, so that the LED lighting equipment 2 can be controlled to be with an illuminating level, such as full brightness, slight brightness, or non-brightness.

Figure 3:
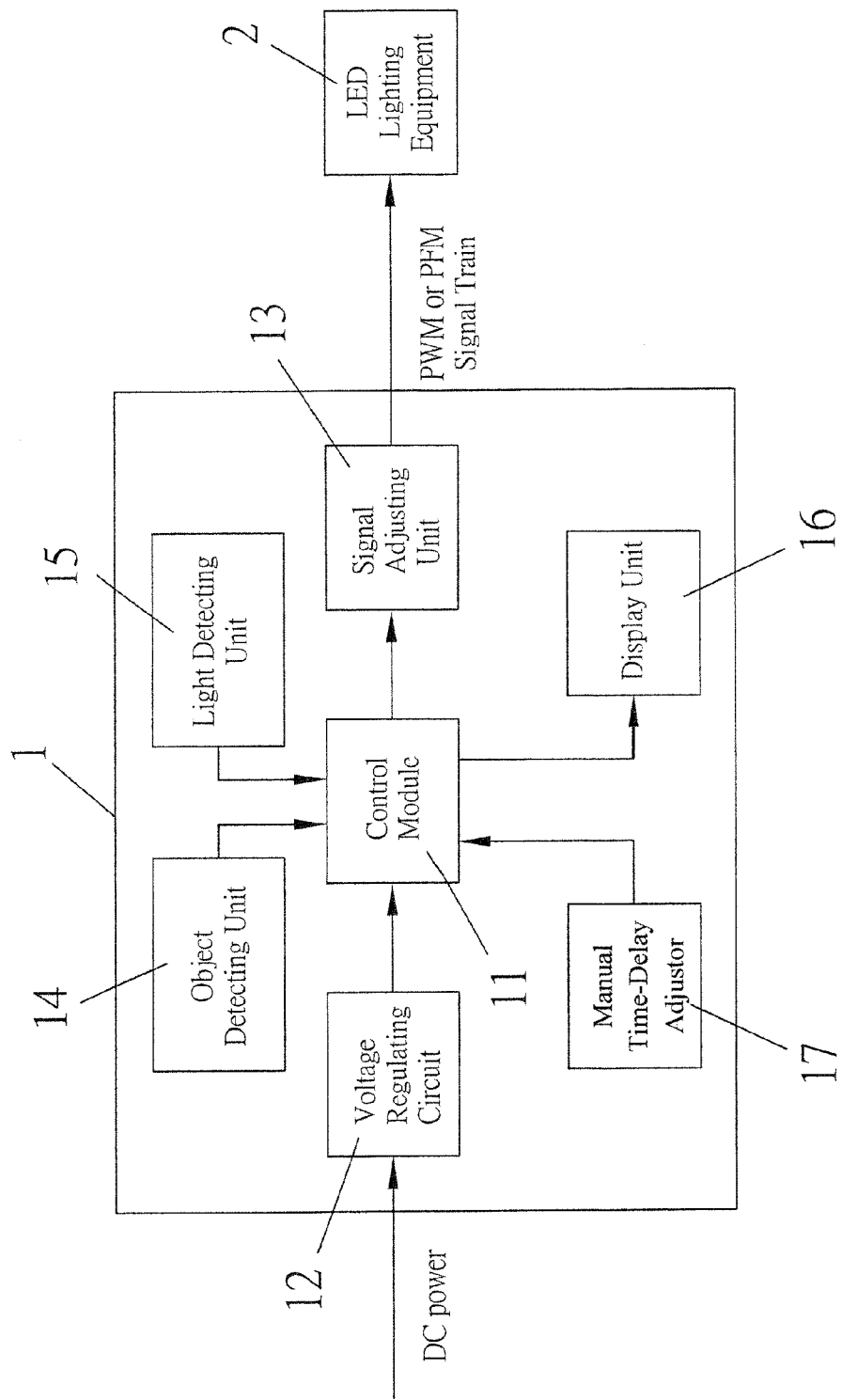
FIG. 3 is a block diagram of the present invention, which shows a second embodiment of the present invention.

Turning next to FIG. 3, the sensing device 1 of the present invention is further provided with a manual time-delay adjustor 17. The manual time-delay adjustor 17 may comprise a variable resistor being electrically connected to the control module 11, so that the variable resistor can be adjusted to output a voltage to the control module 11 for adjusting a delay time between a first illuminating level and a second illuminating level, so that the control module 11 can modify the signal train of PWM or PFM, according to the delay time, to enable the LED lighting equipment 2 to arrive at the second illuminating level upon the delay time expires. In addition, the control module 11 can determine the delay time by selecting a time-related value from a group of distinct predetermined values, each predetermined value corresponding to a voltage range, so that, if voltages outputted from the variable resistor are within a same voltage range, the delay time will be the same. This feature can facilitate a user to operate the variable resistor. For example, when the variable resistor is operated at a voltage range, 2.5-3.5 volts, the control module 11 can determine a delay time, corresponding to the value of 3.0 volts, which represents the voltage range, so that the delay time between two illuminating levels can be set properly.

Figure 4:
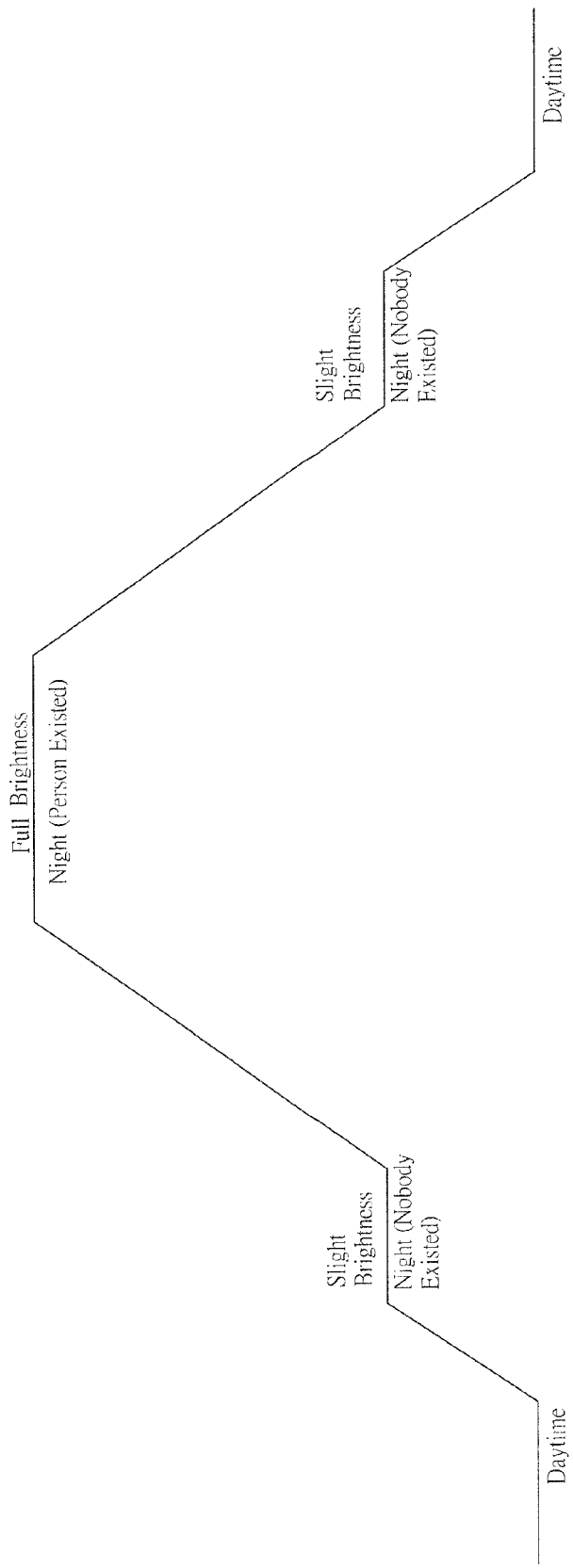
FIG. 4 is a diagram of the present invention, which shows an operation of a 3-state control of an LED lighting equipment.

As shown in FIG. 4, a diagram is used as an example for illustrating an operation of the present invention. While in daytime, the sensing device 1 may turn off the LED lighting equipment 2. While in night and in an unmanned condition, the sensing device 1 may control the LED lighting equipment 2 to have it become slight bright, by outputting a signal train of PWM or PFM. While in night and there is a person existed, the sensing device 1 may control the LED lighting equipment 2 to have it become full bright, by modifying the signal train of PWM or PFM. While in night and again in an unmanned condition, the sensing device 1 may control the LED lighting equipment 2 to have it become slight bright again, by modifying the signal train of PWM or PFM again. While reaching a next daytime, the sensing device 1 may turn off the LED lighting equipment 2 and render it non-bright again. In such way, the sensing device 1 may control the LED lighting device 2 in three states, including full brightness, slight brightness and non-brightness, from daytime to night, by modifying the signal train of PWM or PFM. Between two illuminating levels, the delay function of the control modules 11 can be activated.

Figure 5:
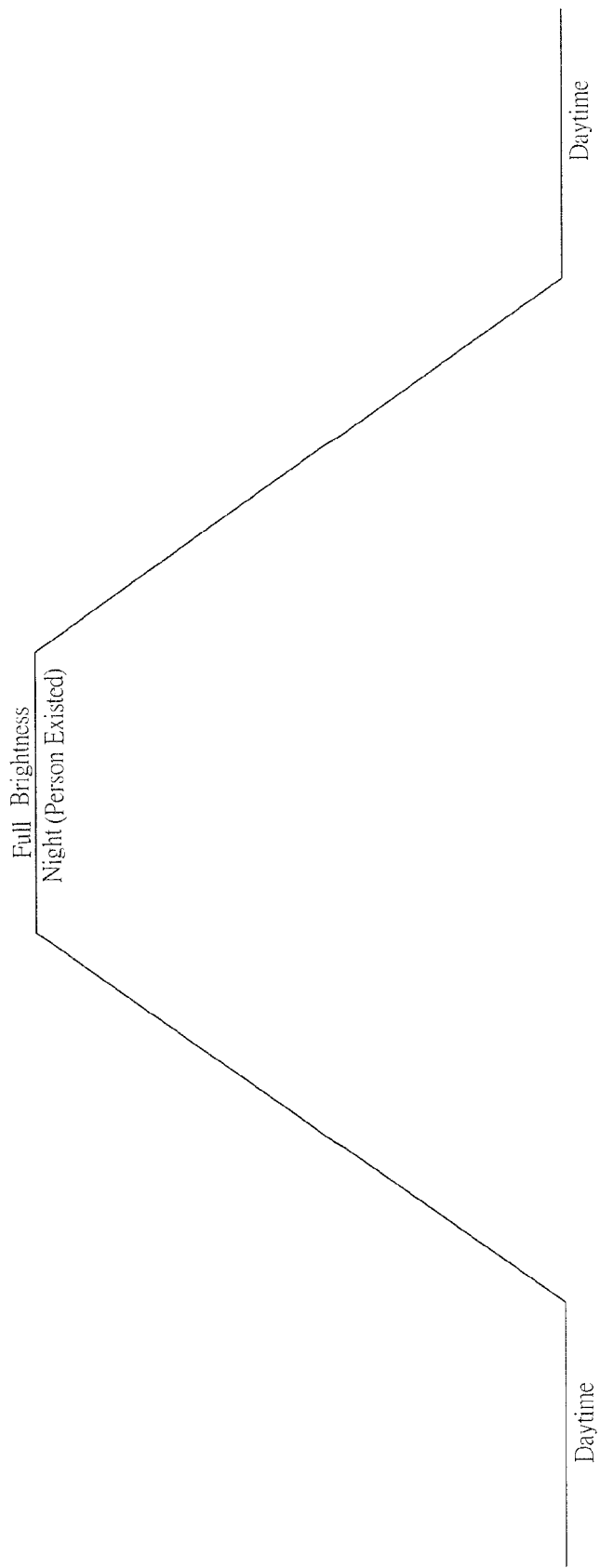
FIG. 5 is a diagram of the present invention, which shows an operation of a 2-state control of an LED lighting equipment.

As shown in FIG. 5, another diagram is used as an example for illustrating an operation of the present invention. While in daytime, the sensing device 1 may turn off the LED lighting equipment 2. While in night and in an unmanned condition, the sensing device 1 may control the LED lighting equipment 2 to have it maintain non-bright. While in night and there is a person existed, the sensing device 1 may control the LED lighting device 2 to have it become full bright. While reaching a next daytime, the sensing device 1 can turn off the LED lighting equipment and render it non-bright again. In such way, the sensing device 1 can control the LED lighting device 2 in two states, including full brightness and non-brightness, from daytime to night, by modifying the signal train of PWM or PFM. Between two illuminating levels, the delay function of the control modules 11 can be activated.

In light of the foregoing, the technical features of the present invention reside in that the sensing device 1 can be supplied with an external DC power source, the control module 11 can send a control signal train of PWM or PFM to the signal adjusting unit 13, which will in turn send an amplified signal train of PWM or PFM to the LED lighting equipment, so as to control the illuminating level of the equipment (including full brightness, slight brightness, and non-brightness). Thus, the problems of the conventional light modulators, resulting from the use of an AC power supply, can be alleviated. Also, the associated cost of the equipment can be reduced.

Although the present invention has been described with a certain degree of particularity, it is understood that the present disclosure is made by way of example only and the combination and arrangement of parts may be resorted to without departing from the spirit and scope of the invention hereinafter claimed.

I claim:

1. A sensing device for controlling an LED lighting equipment, and more especially for electrical connection with at least one LED lighting equipment that can be driven by a DC power supply, wherein the sensing device is supplied with an external DC power source and can actuate the LED lighting equipment, so that the LED lighting equipment can be controlled to be with an illuminating level being selected from a group of predetermined levels including full brightness and non-brightness, said sensing device comprising:
   a control module, capable of receiving external signals and outputting control signals after the external signals being processed, and capable of sending a control signal train of pulse-width modulation;
   a signal adjusting unit, being electrically connected to said control module for receiving the control signal train of pulse-width modulation from said control module and increasing the driving force of the control signal train, so that said signal adjusting module can output an amplified signal train of pulse-width modulation, which can directly actuate the LED lighting equipment;
   an object detecting unit, being electrically connected to said control module, for detecting and determining whether a person is existed or not, so as to send a signal to said control module, whereby said control module can modify the control signal train of pulse-width modulation to allow the LED lighting equipment to be gradually changed to a different illuminating level in response to a state change of the signal sent from said object detecting unit; and
   a manual time-delay adjustor, being electrically connected to said control module, for adjusting a delay time between a first illuminating level and a second illuminating level, whereby said control module can modify the signal train of pulse-width modulation, according to the delay time, to enable the LED lighting equipment to arrive at the second illuminating level upon the delay time expires.

2. A sensing device for controlling an LED lighting equipment as claimed in claim 1, wherein said control module is a microcontroller unit or a control IC.

3. A sensing device for controlling an LED lighting equipment as claimed in claim 1, wherein said object detecting unit can be a unit employing a technique of active infrared light, passive infrared light, ultrasound, or microwave.

4. A sensing device for controlling an LED lighting equipment as claimed in claim 1, wherein said manual time-delay adjustor comprises a variable resistor that can be adjusted to output a voltage to said control module so as to control the delay time between two illuminating levels.

5. A sensing device for controlling an LED lighting equipment as claimed in claim 4, wherein said control module can select a time value for the delay time from a group of distinct predetermined values, each predetermined value corresponding to a voltage range, so that, if voltages outputted from said variable resistor are within a same voltage range, the delay time will be the same.

6. A sensing device for controlling an LED lighting equipment as claimed in claim 5, wherein said sensing device further comprises a light detecting unit, being electrically connected to said control module, to cooperate with said object detecting unit so as to provide the LED lighting equipment with more illuminating levels.

7. A sensing device for controlling an LED lighting equipment, and more especially for electrical connection with at least one LED lighting equipment that can be driven by a DC power supply, wherein the sensing device is supplied with an external DC power source and can actuate the LED lighting equipment, so that the LED lighting equipment can be controlled to be with an illuminating level being selected from a group of predetermined levels including full brightness and non-brightness, said sensing device comprising:

- a control module, capable of receiving external signals and outputting control signals after the external signals being processed, and capable of sending a control signal train of pulse-frequency modulation;
- a signal adjusting unit, being electrically connected to said control module for receiving the control signal train of pulse-frequency modulation from said control module and increasing the driving force of the control signal train, so that said signal adjusting unit can output an amplified signal train of pulse-frequency modulation, which can directly actuate the LED lighting equipment;
- an object detecting unit, being electrically connected to said control module, for detecting and determining whether a person is existed or not, so as to send a signal to said control module, whereby said control module can modify the control signal train of pulse-frequency modulation to allow the LED lighting equipment to be gradually changed to a different illuminating level in response to a state change of the signal send from said object detecting unit; and
- a manual time-delay adjustor, being electrically connected to said control module, for adjusting a delay time between a first illuminating level and a second illuminating level, whereby said control module can modify the control signal train of pulse-frequency modulation, according to the delay time, to enable the LED lighting equipment to arrive at the second illuminating level upon the delay time expires.

8. A sensing device for controlling an LED lighting equipment as claimed in claim 7, wherein said control module is a microcontroller unit or a control IC.

9. A sensing device for controlling an LED lighting equipment as claimed in claim 7, wherein said object detecting unit can be a unit employing a technique of active infrared light, passive infrared light, ultrasound, or microwave.

10. A sensing device for controlling an LED lighting equipment as claimed in claim 7, wherein said manual time-delay adjustor comprises a variable resistor that can be adjusted to output a voltage to said control module so as to control the delay time between two illuminating levels.

11. A sensing device for controlling an LED lighting equipment as claimed in claim 10, wherein said control module can select a time value for the delay time from a group of distinct predetermined values, each predetermined value corresponding to a voltage range, so that, if voltages outputted from said variable resistor are within a same voltage range, the delay time will be the same.

12. A sensing device for controlling an LED lighting equipment as claimed in claim 11, wherein said sensing device further comprises a light detecting unit, being electrically connected to said control module, to cooperate with said object detecting unit so as to provide the LED lighting equipment with more illuminating levels.

\* \* \* \* \*